March 29, 1927.
G. J. KALBERER
CASTER
Filed Oct. 15, 1925
1,622,447
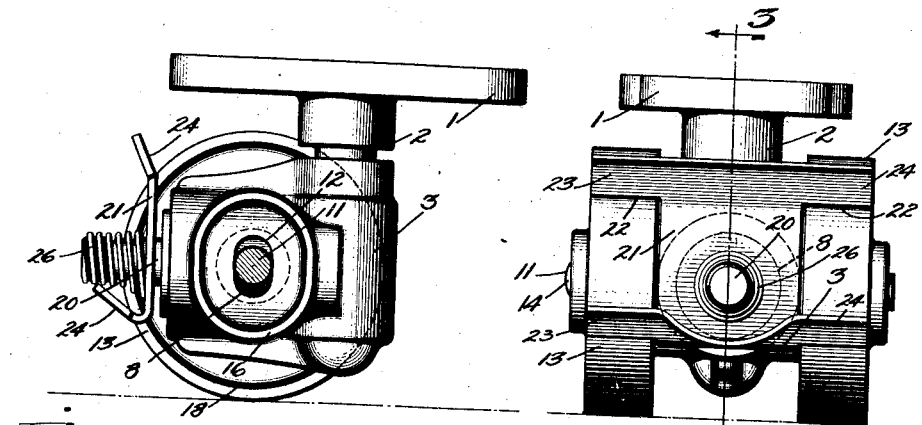
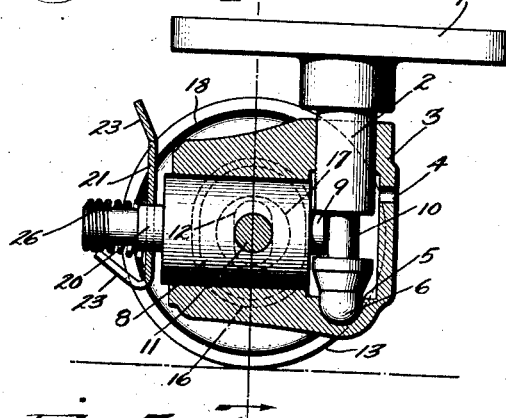
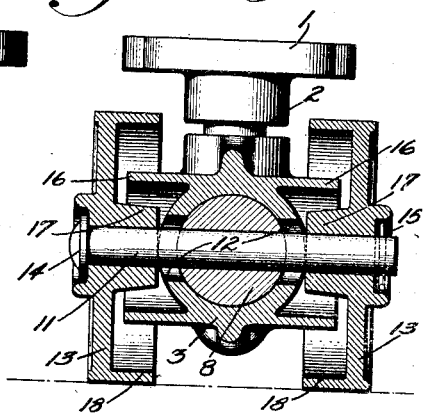
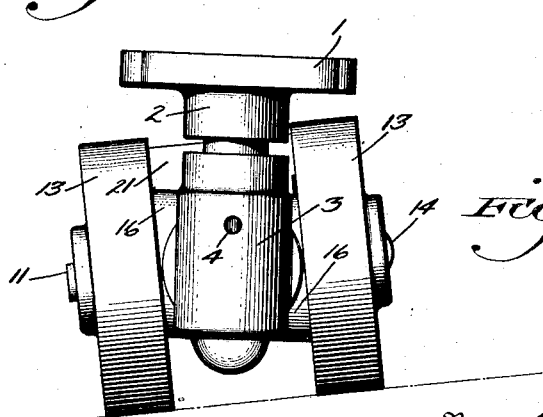
Inventor
George J. Kalberer
By Ward & Ward
Attorneys Patented Mar. 29, 1927.

1,622,447

UNITED STATES PATENT OFFICE.

GEORGE J. KALBERER, OF HAMILTON, OHIO.

CASTER.

Application filed October 15, 1925. Serial No. 62,676.

My invention relates to casters, and particularly to a caster of the swiveling double or twin wheel type and to guard and scraping mechanism for the wheels.

In the use of the caster for trucks, racks, and the like in manufacturing plants in which a waste product as lint or fibre becomes scattered upon the floor it is easily picked up or entangled in the caster, clogging the wheel journals and interfering with its freedom of operation.

It is therefore an object of the invention to provide the caster with a fulcrumed scraper yieldingly engaging the periphery of the wheels and extensions on the caster body or carriage for housing the wheel hubs, the scraper guarding the wheels and journals preventing any lint, fibre or other material adhering to the roll periphery or becoming wound around the hub or axle interfering with their free winding or rotation.

Another object is to provide a double wheeled caster of the swivel type with an axle for the wheels pivotally mounted to provide for vertical rocking of the wheel axle in relation to the caster carriage.

Another object is to provide a caster in which the various elements cooperate to maintain the caster assembly reducing to a minimum the assembling operations.

Other objects and certain advantages will be more fully set forth in the description of the accompanying drawings forming a part of this specification, in which:

Figure 1 is a side view of my improved caster with one wheel removed and the axle shown in section.

Figure 2 is a rear view of the caster showing the wheel scraper mounted thereon.

Figure 3 is a central vertical section taken on line 3—3, Figure 2.

Figure 4 is a central vertical section taken at right angles to Figure 3 on line 4—4, Figure 3, detailing the carriage and extensions thereon housing the wheel hubs.

Figure 5 is a front view of the caster, showing the position of the wheels and axle in relation to the carriage when the caster is on uneven flooring.

The caster consists of an attachment plate 1, having a swivel post or spindle 2 extending downwardly into the carriage or body 3, which is cored and bored to provide an upper journal portion, a clearance portion into which a lubricant can be fed through a duct 4 and a concave seat or socket 5 for seating the ball end 6 of the shank or post 2.

Swivelled within a transverse bore of the carriage 3 is a pivot stud or swivelling bearing 8 having an extension 9 on its inner end engaging into an annular groove 10 in the swivel post 2, for confining the post against longitudinal displacement and rotatively connect the post to the carriage.

An axle 11 is engaged through the pivot 8 (see Fig. 4) passing through vertical slots 12—12 in the carriage, wheels 13—13 being journaled on the opposite ends of the axle, and held thereon by means of a head 14 at one end of the axle and a cotter pin 15 inserted in the opposite end. The axle confines the pivot stud 8 against longitudinal displacement although free to rock to a limited degree.

Thus it can be seen that the axle 11 is mounted in the pivot 8 and has no direct bearing in the carriage 3 merely passing through the vertical slots 12 this allowing the wheels and axle to rock in a vertical plane and in relation to the carriage. Removal of the cotter pin 15 permits the caster to be readily disassembled should occasion require.

Hollow oblong extensions or housings 16 are provided integral with the carriage (see Fig. 4) and extend about the inner hubs 17 of the wheels 13. The rims 18 of the wheels overhang the extensions 16 amply guarding the hub and axle.

The pivot 8 is provided at its outer end with the stud extension 20 having the scraper 21 pivotally mounted thereon. The scraper comprises a sheet metal plate having notches 22 cut into its opposite ends to provide for wheel clearance and forms scraping blades 23, 24, respectively for each wheel, suitably inclined from the body of the scraper for an edge engagement with the periphery of the wheels. The direction of rotation is always the same in this type of caster, the edges 23, 24, tending to cut adhering substances from the wheel periphery. The blade portions 23, 24, are held against the wheel periphery by means of the spring 26 coiled about the stud 20 and bearing against the scraper. The outer end of the stud is screw threaded to receive some of the outer coils of the spring 26 as a means for holding the spring thereon.

Having described my invention, I claim:

1. In a double wheel caster, a body, a swivelling bearing journalled in said body, an axle transversely extending through said bearing to swivel thereto and confine the bearing within the body, said axle carrying wheels respectively at its opposite ends, and a spindle for securing the caster in use, swivelled in said body transversely to said bearing and in interlocking engagement therewith for confining the spindle against axial displacement from the body.

2. In a double wheel caster, a body, a bearing journalled in said body to swivel on a horizontal axis, an axle transversely extending through said bearing to swivel therewith and through said body to confine the bearing against axial displacement, and wheels respectively on the opposite ends of said axle.

3. In a double wheel caster, a body, a swivelling bearing journalled in said body, an axle transversely extending through said bearing to swivel therewith and confine the bearing within the body, wheels respectively on the opposite ends of said axle, the body having angular extensions for guarding the inner side hubs of the wheels and non-interfering to the swing of the axle, and a spindle for securing the caster in use swivelled in said body transversely to said bearing and in interlocking engagement therewith for confining the spindle against axial displacement from the body.

In witness whereof, I hereunto subscribe my name.

GEORGE J. KALBERER.